United States Patent
Lee

(10) Patent No.: US 11,220,439 B2
(45) Date of Patent: Jan. 11, 2022

(54) FORCED AIR INJECTION SYSTEM FOR RAPID EVAPORATION OF WASTEWATER

(71) Applicant: Tae-Woo Lee, Chandler, AZ (US)

(72) Inventor: Tae-Woo Lee, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/901,230

(22) Filed: Jun. 15, 2020

(65) Prior Publication Data

US 2021/0032124 A1 Feb. 4, 2021

Related U.S. Application Data

(60) Provisional application No. 62/881,093, filed on Jul. 31, 2019.

(51) Int. Cl.
*C02F 1/04* (2006.01)
*B01D 1/20* (2006.01)
*B01D 1/14* (2006.01)

(52) U.S. Cl.
CPC ............. *C02F 1/043* (2013.01); *B01D 1/14* (2013.01); *B01D 1/20* (2013.01); *C02F 2201/002* (2013.01)

(58) Field of Classification Search
None
See application file for complete search history.

(56) References Cited

U.S. PATENT DOCUMENTS 7,874,548 B1 * 1/2011 McGuffin ............ B01F 3/04517
261/120

OTHER PUBLICATIONS

ASSDA, 2016, Corrosion resistance in Marine Environments, https://www.assda.asn (retrieved Jun. 1, 2021). (Year: 2016).*
California Air Tools, Sound Proof Cabinet, 2015, https://www.californiaairtools.com (retrieved Jun. 1, 2021). (Year: 2015).*
Das, et al., Design and Implementation of a PLC Based Screw Air Compressor for Industrial Applications, 2011, Proceedings of the International Conference of Engineering Research, Innovation, and Education 2011, CERIE 2011, pp. 512-516. (Year: 2011).*

* cited by examiner

*Primary Examiner* — Derek N Mueller
(74) *Attorney, Agent, or Firm* — Michael Best & Friedrich LLP

(57) ABSTRACT

A wastewater evaporation system includes a plurality of tube sections configured to direct compressed air into the wastewater. A portion of the manifold defines an injection head configured to be at least partially submerged below a surface of the wastewater. The wastewater evaporation system also includes an air compressor configured to direct the compressed air to the manifold. The wastewater evaporation system also includes a buoy system coupled to the manifold. The buoy system includes a buoy configured to maintain a portion of the manifold above the surface of the wastewater.

20 Claims, 17 Drawing Sheets

| Air Used | Set Up | Observed Ave. Evap. Rate [m³/h] | Ave. Rel. Humidity [%] |
|---|---|---|---|
| None | Natural | $1.03689 \times 10^{-4}$ | 45 |
| Shop Air | Bubbles Single Pipe Outlet | $1.52076 \times 10^{-4}$ | 42.67 |
| | Bubbles-Jet Single Pipe Low Output | $1.20073 \times 10^{-4}$ | 50 |
| | Bubbles-Jet Single Pipe Medium Output | $1.35906 \times 10^{-4}$ | 49 |
| | Bubbles Two Pipe Outlets-LO | $9.72612 \times 10^{-5}$ | 60.67 |
| | Bubbles Two Pipe Outlets-MO | $1.46772 \times 10^{-4}$ | 62 |
| | Bubbles Two Pipe Outlets-HO | $1.78349 \times 10^{-4}$ | 60.5 |

*FIG. 7*

| Air Used | Set Up | Observed Ave. Evap. Rate [m³/h] | Ave. Rel. Humidity [%] |
|---|---|---|---|
| None | Natural | $1.03689 \times 10^{-4}$ | 45 |
| Compressed Air | Bubbles Two Pipe Outlets | $2.05766 \times 10^{-4}$ | 60.86 |
| | Bubbles Two Pipe Outlets w/Valve 10 psi Upstream | $1.90841 \times 10^{-4}$ | 62.33 |
| | Bubbles Two Pipe Outlets w/Valve 15 psi Upstream | $1.72515 \times 10^{-4}$ | 62 |
| | Bubbles One Pipe w/ Inj. Outlet 4 psi | $1.9462 \times 10^{-4}$ | 53 |

*FIG. 8*

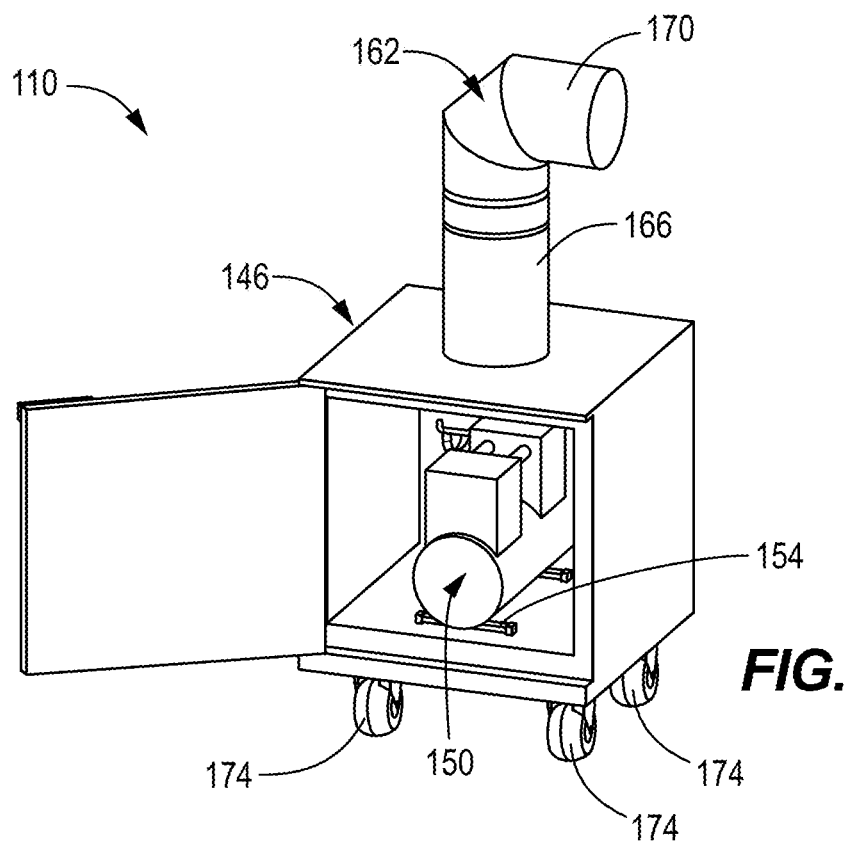
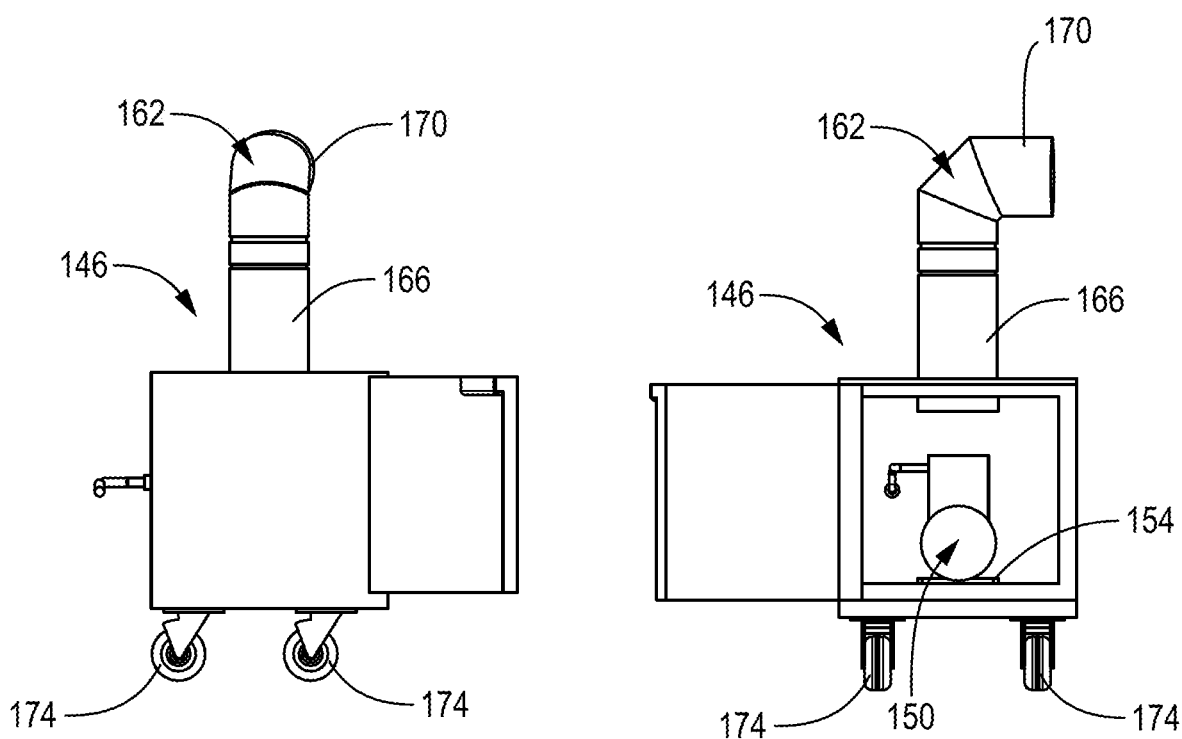
FIG. 10
FIG. 11
FIG. 12

| Tank | Injector Configuration | ΔZ (in.) | Air Temp. Min./Max. (°F) | Rel. Humidity (%) | Evap. Rate (in³/hr) | Ave. Evaporation Increase (%) |
|---|---|---|---|---|---|---|
| Day 1 1:00 PM | Aerated | 2 Injectors | 0 | 65/88 | 53 | N/A | N/A |
| | Non-Aerated | None | 0 | | | N/A | N/A |
| Day 2 2:28 PM | Aerated | 2 Injectors | 6.45 | 57/83 | 26 | 108.0026 | 23.2 |
| | Non-Aerated | None | 5.11 | | | 87.6663 | |
| Day 3 1:00 PM | Aerated | 4 Injectors | 0 | 71/96 | 12 | N/A | N/A |
| | Non-Aerated | None | 0 | | | N/A | N/A |
| Day 4 10:42 AM | Aerated | 4 Injectors | 5.597 | 81/109 | 11 | 112.258 | 19.27 |
| | Non-Aerated | None | 4.58 | | | 94.1213 | |

FIG. 20

| | Inj. Config. | Amb. Temp. (°F) | Rel. Humidity (%) | ΔZ (in.) | Observed Evap. (in³/hr) | Improvement % |
|---|---|---|---|---|---|---|
| Day 1 | None | 100 | 32 | 0 | 0 | |
| | 8 | 100 | 32 | 0 | 0 | |
| Day 2 | None | 92 | 38 | 9.1723 | 137.6566 | |
| | 8 | 92 | 38 | 10.7721 | 157.7819 | 14.62 |
| Day 3 | None | 99 | 15 | 0 | 0 | |
| | 8 | 99 | 15 | 0 | 0 | |
| Day 4 | None | 96 | 19 | 2.3077 | 129.28 | |
| | 8 | 96 | 19 | 2.7206 | 148.7501 | 15.06 |
| Day 5 | None | 101 | 26 | 0 | 0 | 0 |
| Filter Change | 8 | 101 | 26 | 0 | 0 | 0 |
| Day 6 | None | 99 | 33 | 1.6741 | 92.302 | |
| | 8 | 99 | 33 | 2.01923 | 111.3307 | 20.6157 |
| Day 7 | None | 101 | 31 | 2.5931 | 119.0222 | |
| | 8 | 101 | 31 | 3.1891 | 141.7816 | 19.12 |
| Day 8 | None | 89 | 13 | 0 | 0 | |
| | 4 | 89 | 13 | 0 | 0 | |
| Day 9 | None | 88 | 9 | 1.1426 | 41.6523 | |
| | 4 | 88 | 9 | 1.3889 | 50.6315 | 21.56 |
| Day 10 | None | 81 | 18 | 0 | 0 | |
| | 4 | 81 | 18 | 0 | 0 | |
| Day 11 | None | 79 | 23 | 1.125 | 61.4994 | |
| | 4 | 79 | 23 | 1.4489 | 79.2039 | 28.79 |
| Day 12 | None | 77 | 32 | 1.5625 | 56.9472 | |
| | 4 | 77 | 32 | 1.9602 | 71.4429 | 25.45 |

*FIG. 21*

| Tank | Injector Conf. | Amb. Temp. (°F) | Rel. Hum. (%) | Observed Evap. Rate (in³/hr) | Modified Mass Trans. Evap. (in³/hr) | Lund Equation Evap. Rate (in³/hr) | Dalton Equation Evap. Rate (in³/hr) |
|---|---|---|---|---|---|---|---|
| Non-Aerated | None | 71 | 53 | N/A | 85.6525 | 86.1162 | 87.6275 |
| Aerated | 2 Injectors | | | N/A | 108.7079 | 110.2262 | 108.7008 |
| Non-Aerated | None | 73 | 26 | 87.6663 | 83.3862 | 88.1266 | 86.57023 |
| Aerated | 2 Injectors | | | 108.0026 | 109.5538 | 109.4667 | 107.3967 |
| Non-Aerated | None | 92 | 12 | N/A | 89.7814 | 92.8589 | 88.3581 |
| Aerated | 4 Injectors | | | N/A | 104.9463 | 112.3789 | 110.4683 |
| Non-Aerated | None | 107 | 11 | 94.1213 | 106.2483 | 98.9013 | 97.8169 |
| Aerated | 4 Injectors | | | 112.258 | 124.1947 | 111.5404 | 117.3595 |
| Non-Aerated | None | 100 | 32 | N/A | 125.419 | 140.9836 | 126.0505 |
| Aerated | 8 Injectors | | | N/A | 156.2265 | 151.3564 | 157.4723 |
| Non-Aerated | None | 92 | 38 | 137.6566 | 127.4502 | 130.4709 | 119.6425 |
| Aerated | 8 Injectors | | | 157.7819 | 152.0159 | 146.9269 | 153.2952 |
| Non-Aerated | None | 99 | 15 | N/A | 126.5303 | 128.0095 | 114.4507 |
| Aerated | 8 Injectors | | | N/A | 151.3064 | 149.9212 | 141.6429 |
| Non-Aerated | None | 96 | 19 | 129.2805 | 116.9714 | 119.4438 | 111.2419 |
| Aerated | 8 Injectors | | | 148.7501 | 139.7208 | 145.718 | 147.2729 |

*FIG. 22*

| Tank | Injector Conf. | Amb. Temp. (°F) | Rel. Hum. (%) | Air Flow Per Injector (cfm) | Modified Mass Trans. Evap. (in³/hr) | Lund Equation Evap. Rate (in³/hr) | Dalton Equation Evap. Rate (in³/hr) | Average Evaporation Increase (%) |
|---|---|---|---|---|---|---|---|---|
| Non-Aerated | None | 35 | 48 | 0 | 27.2278 | 26.856 | 26.8263 | N/A |
| Aerated | 4 Injectors | | | 1 | 39.165 | 38.4343 | 39.5567 | 44.8 |
| Non-Aerated | None | 50 | 48 | 0 | 32.3201 | 34.1566 | 33.7342 | N/A |
| Aerated | 4 Injectors | | | 1 | 45.194 | 48.0841 | 47.1677 | 40.14 |
| Non-Aerated | None | 65 | 48 | 0 | 46.2004 | 48.4735 | 47.719 | N/A |
| Aerated | 4 Injectors | | | 1 | 61.2633 | 60.5918 | 60.8553 | 28.38 |
| Non-Aerated | None | 80 | 48 | 0 | 65.583 | 66.2674 | 66.0464 | N/A |
| Aerated | 4 Injectors | | | 1 | 83.9664 | 80.6734 | 81.91 | 24.6 |

*FIG. 23*

FORCED AIR INJECTION SYSTEM FOR RAPID EVAPORATION OF WASTEWATER

CROSS-REFERENCE TO RELATED APPLICATIONS

This application claims priority to U.S. Provisional Application No. 62/881,093, filed Jul. 31, 2019, the entire contents of which are incorporated herein by reference.

FIELD

The present disclosure relates to a method of evaporating wastewater. The method may be used in external or internal environments, such as enclosures dedicated for evaporating wastewater.

BACKGROUND

Wastewater from power plants and other industries needs to be evaporated so that residues within the wastewater can be disposed of properly. In most power plants, evaporation cannot keep up with the amount of wastewater generated. To speed up the evaporation process, either natural evaporation or spray injections can be used. Natural evaporation is slow, and highly dependent on ambient temperature and humidity. Thus, natural evaporation may be too slow to use with a power plant. Spray injection can be effective by increasing the surface area for evaporation, but the sprays contain the residues. Ambient wind can spread the residue, which is potentially harmful to the environment. Environmental regulations thus limit or prohibit spray evaporation due to residue spreading.

SUMMARY

In one embodiment, a wastewater evaporation system includes a manifold having a plurality of tube sections configured to direct compressed air into the wastewater. A portion of the manifold defines an injection head configured to be at least partially submerged below a surface of the wastewater. The wastewater evaporation system also includes an air compressor configured to direct the compressed air to the manifold. The wastewater evaporation system also includes a buoy system coupled to the manifold. The buoy system includes a buoy configured to maintain a portion of the manifold above the surface of the wastewater.

In another embodiment, a method for evaporating wastewater includes positioning an injection head beneath the surface of the wastewater, and injecting air through the injection head and into the wastewater. The air promotes evaporation of the wastewater.

Other aspects of the disclosure will become apparent by consideration of the detailed description and accompanying drawings.

BRIEF DESCRIPTION OF THE DRAWINGS

FIG. 7 is a table illustrating the evaporation rate at various operating conditions using uncompressed air.

FIG. 8 is a table illustrating the evaporation rate at various operating conditions using compressed air.

FIGS. 10-12 are perspective views of a cabinet of the wastewater evaporation system of FIG. 9.

FIGS. 20-24 are charts and graphs providing details of testing conducted on the wastewater evaporation system of FIG. 9.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

In general, the present disclosure relates to a method for rapidly evaporating wastewater using a forced air injector. Rapid evaporation is used so that a volume can be compacted for disposal. The method limits or reduces the harmful environmental side effects of spray evaporation.

Figure 1:
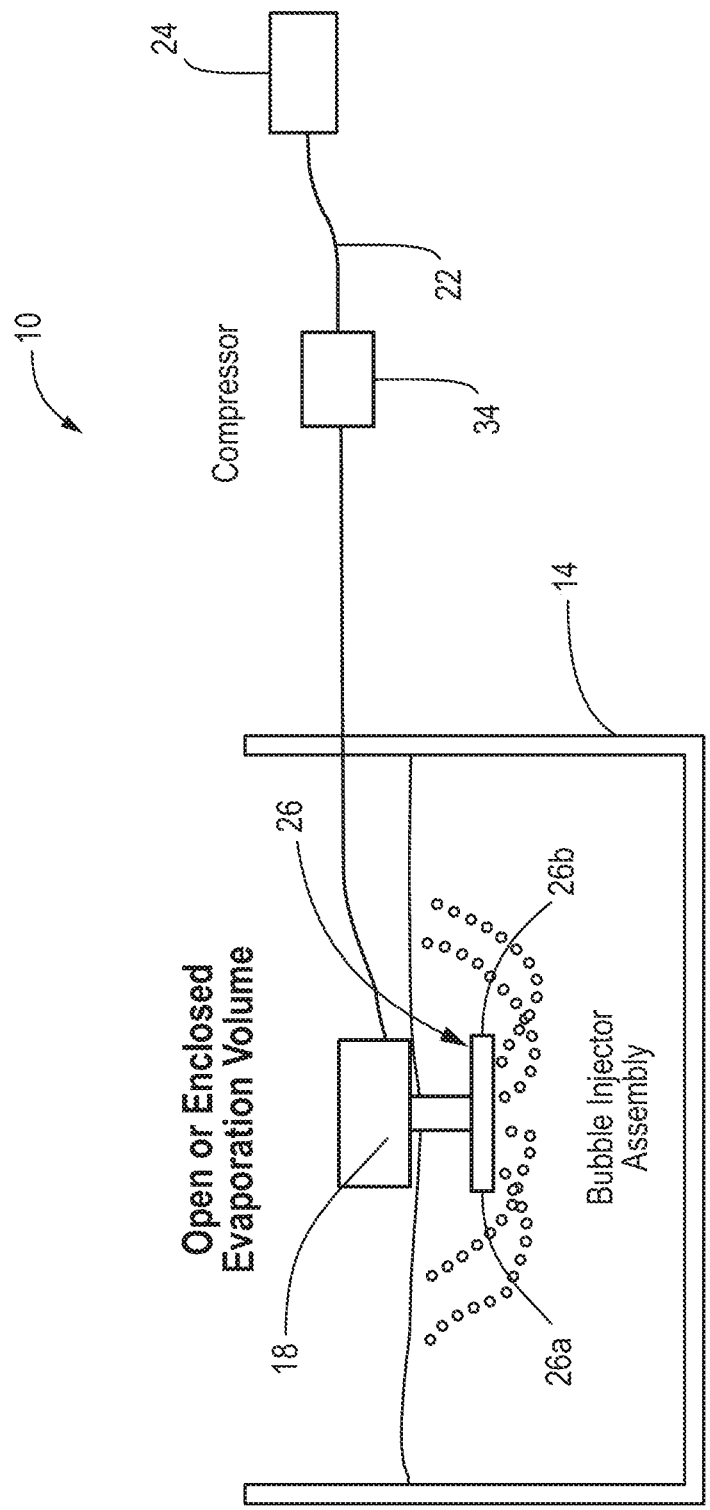
FIG. 1 is a schematic view of a wastewater evaporation system.
Figure 2:
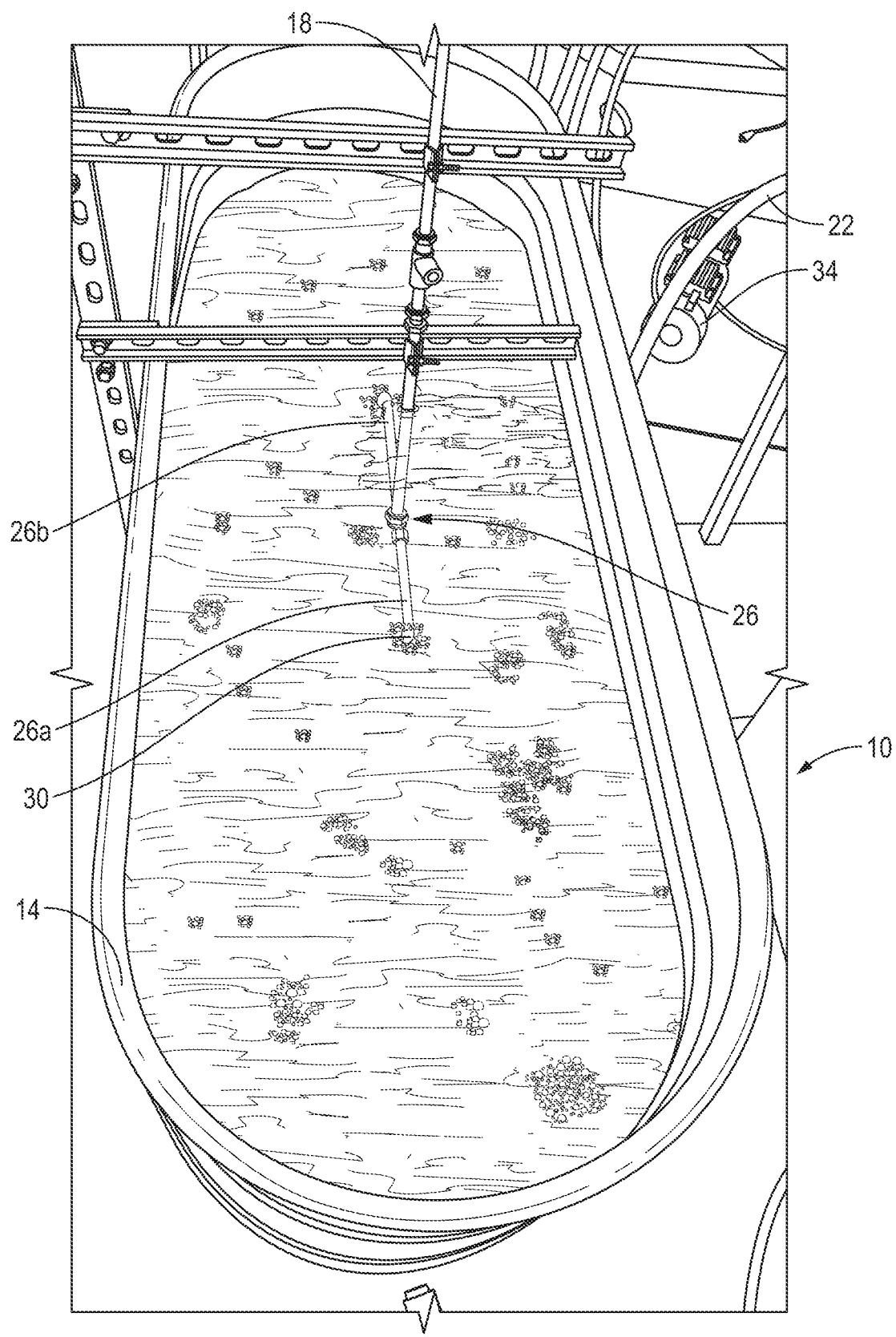
FIG. 2 is a perspective view of a prototype of the wastewater evaporation system of FIG. 1.
Figure 3:
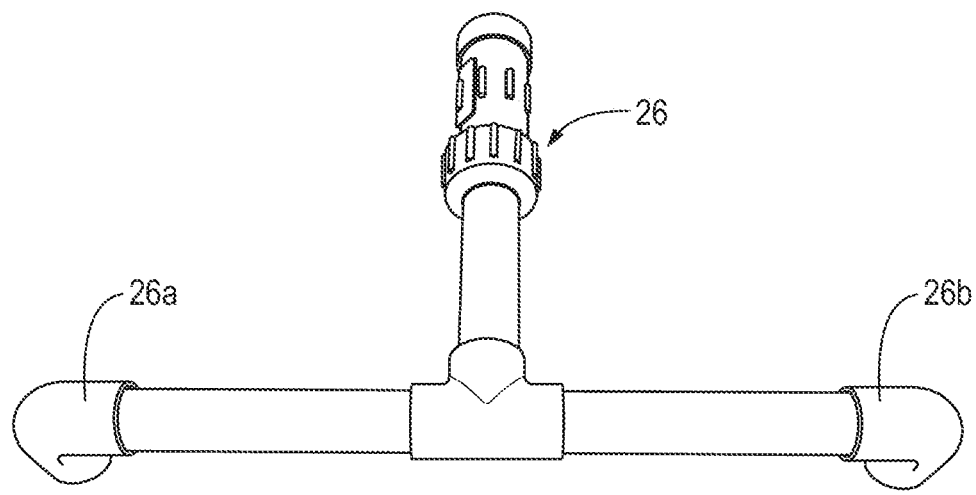
FIG. 3 is a perspective view of an injection head used with the wastewater evaporation system of FIG. 1.
Figure 4:
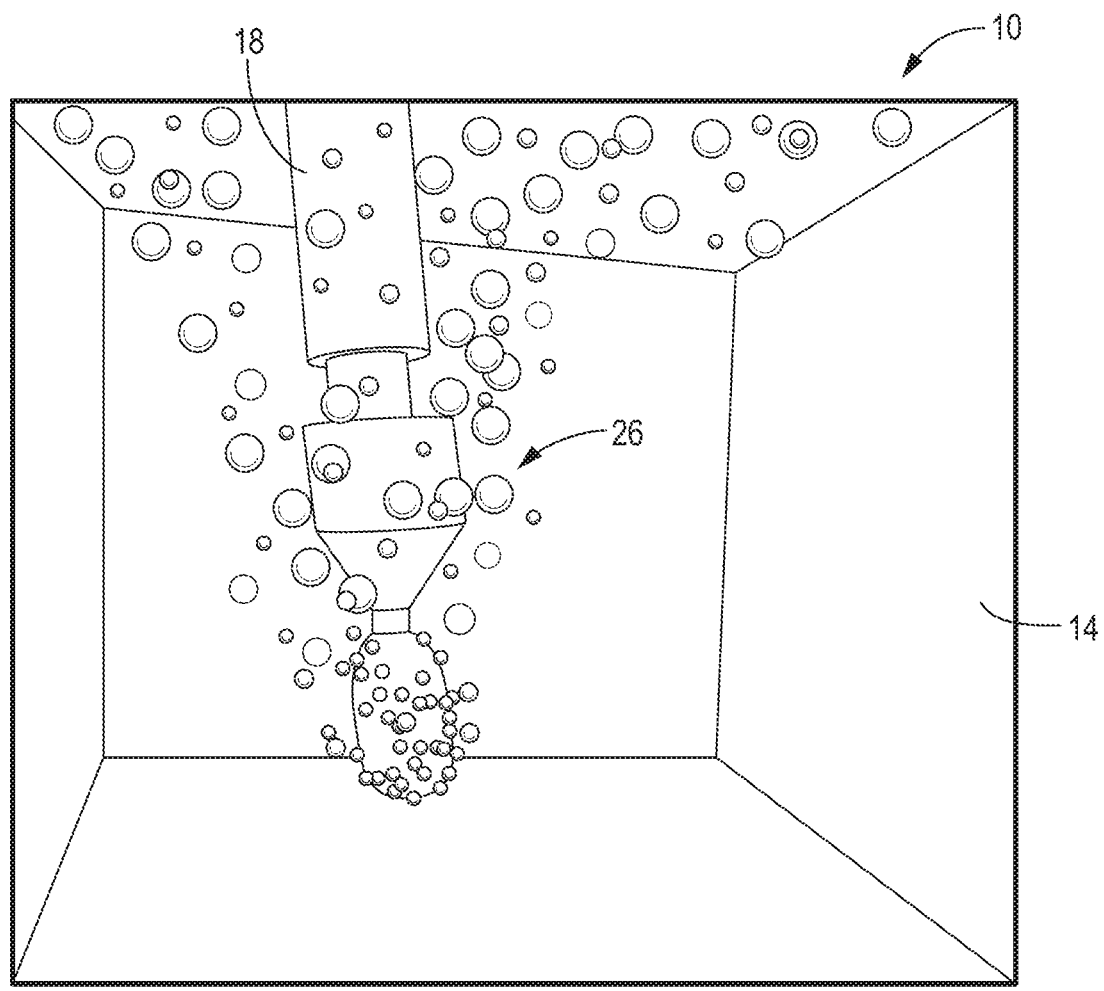
FIG. 4 is a side view of a portion of the wastewater evaporation system of FIG. 1, viewed below the surface of the wastewater.

As shown in FIGS. 1-3, a wastewater evaporation system 10 may be used with wastewater (e.g., from power plants) to accelerate the speed at which the wastewater evaporates. The wastewater evaporation system 10 is positioned proximate to a container 14 (e.g., tank) that stores the wastewater. In the illustrated embodiment, the container 14 is open to the atmosphere. In other embodiments, the container 14 is enclosed and may have a pressure different than atmospheric pressure. In some embodiments, the container 14 is an evaporation pond.

The wastewater evaporation system 10 includes a manifold 18 that is connected to a fluid line 22 (e.g., a hose). The manifold 18 is positioned proximate to the surface of the wastewater, and the fluid line 22 extends out of the container 14. A portion of the manifold 18 is submerged under the wastewater. The fluid line 22 transports air from an external pump 24 to the manifold 18.

As shown in FIGS. 1-4, the manifold 18 includes an injection head 26 that is positioned below the surface of the wastewater. In the illustrated embodiment, the injection head 26 includes a first outlet 26a and a second outlet 26b. The manifold 18 directs the airflow so that air travels out through both outlets 26a, 26b. The first and second outlets 26a, 26b are disposed on opposite sides of the injection head 26, so that air flowing through the first outlet 26a is directed in a generally opposite direction than the air flowing through the second outlet 26b. The injection head 26 is oriented so that air exits the first and second outlets 26a, 26b in a direction generally horizontal to the surface of the wastewater. In other embodiment, the injection head 26 may only have a single outlet 26a. In other embodiments, the wastewater evaporation system 10 may include more than one manifold 18, and each manifold 18 may include an injection head 26 with at least one outlet 26a. The number of manifolds 18, injection heads 26, and outlets 26a, 26b may be changed based on a required flow rate and/or available compression pressure for a given container 14.

In the illustrated embodiment, a nozzle 30 (an outlet) is coupled to each outlet 26a, 26b to alter the flow of air into the container 14. In some embodiments, the nozzle 30 is a mister nozzle (e.g., a brass mister nozzle). In some embodiments, the nozzle 30 is a jet nozzle (e.g., a plastic jet nozzle). In other embodiments, other materials or other types of nozzles 30 may be coupled to the outlets 26a, 26b. The nozzles 30 may change the velocity or flow rate of the air entering the container 14. Additionally, the nozzles 30 may be interchanged depending on required flow rates and/or available compression pressures.

In the illustrated embodiment, a compressor 34 is coupled to the fluid line 22 upstream from the manifold 18. The compressor 34 is positioned outside of the container 14. The compressor 34 pressurizes the air as the air flows from the external pump 24 toward the manifold 18. The compressor 34 may raise the temperature of the air as a result of adiabatic heating (e.g., compression heating).

In use, the wastewater evaporation system 10 is assembled and installed in the container 14 so that the outlets 26a, 26b (or single outlet 26a) are below the surface of the wastewater. The external pump 24 is turned on and air is injected through the nozzles 30, and into the wastewater. Air bubbles form under the surface of the water as a result of the streams of air. This increases the surface area for the water to evaporate into the air bubbles. Additionally, the mass transfer increases as a result of the streams of air because of the buoyant motion of the bubbles through the water. Finally, pumping the air increases the temperature of the air that travels through the fluid line 22. Using a compressor 34 further increases the temperature of the air traveling through the fluid line 22. Higher temperatures are generally advantageous for increasing the evaporation rate. The effects of each property are increased (e.g., multiplied) when applied to the container 14 together. As a result, a smaller amount of air flow (e.g., bubble injection) is needed to enhance the evaporation to a sufficient degree. This method also results in cost savings because a smaller flowrate is required, meaning that less power is needed. This method also provides cost savings over natural evaporation because an additional evaporation pond is not needed.

At any time during operation of the wastewater evaporation system 10, a user may adjust a flow rate of the external pump 24 or the pressure generated by the compressor 34. Adjusting either of these two variables affects bubble generation and streams of air in the container 14. For example, increasing flow rate or the pressure may increase the bubble generation.

After the wastewater has been evaporated a sufficient amount, a mixture (e.g., a muddy mixture) of water and waste materials may remain in the container 14. A user may then remove this mixture manually in order to completely dispose of the waste.

Various experiments were used to test this method. For example, testing was performed using a bench-top bubble injector in a small container 14, and large injectors (e.g., ¾" diameter injectors) were used in a large container 14 (e.g., a 6 ft. by 2.5 ft tank—FIG. 2). Testing was also performed on a larger scale using field-use injectors (i.e., injectors sufficient for use in a power plant).

Figure 5:
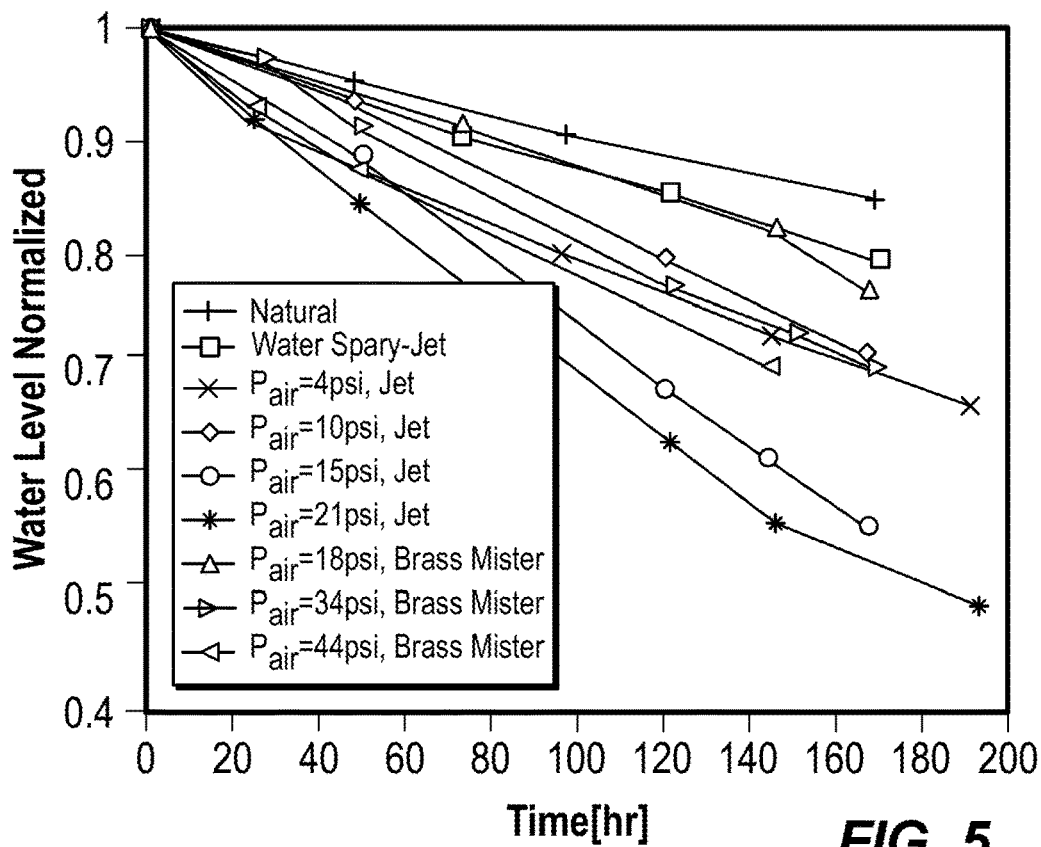
FIG. 5 is a graph illustrating a decrease in wastewater level due to use of the wastewater evaporation system of FIG. 1 at various injection conditions.

As shown in FIG. 5 (data corresponding to testing of tank shown in FIG. 2), the wastewater level in the container 14 decreased over time. Additionally, as the pressure of air supplied to the tank increased for each type of nozzle 30 (e.g., mister nozzle or jet nozzle), the speed at which the water evaporated increased. It was determined that the jet nozzle 30 induced more rapid evaporation then mister nozzle 30 at lower pressures.

Figure 6:
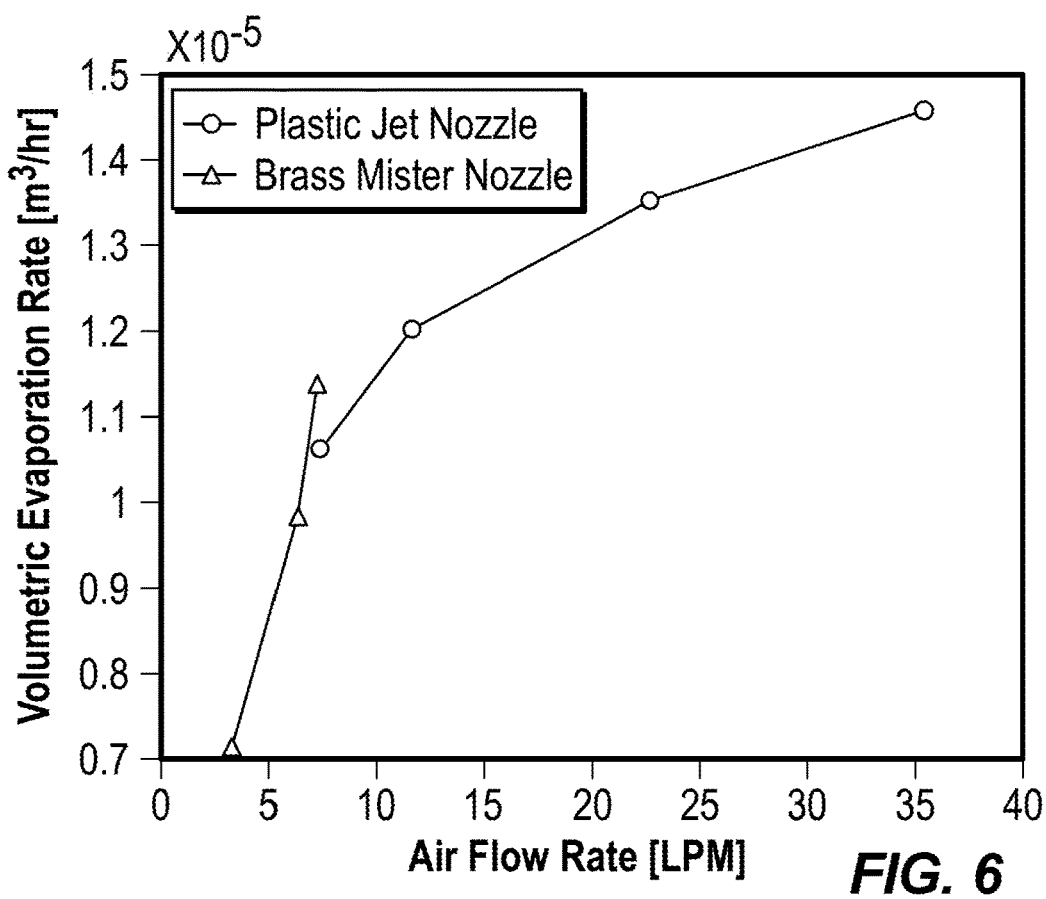
FIG. 6 is a graph illustrating volumetric evaporation rate as a function of air flow rate of the wastewater evaporation system of FIG. 1.

As shown in FIG. 6, the volumetric evaporation rate was measured for each type of nozzle 30. The graph shows the jet nozzle 30 operated at higher volumetric flow rates, and produced a greater volumetric evaporation rate. The graph also shows the mister nozzle 30 operated at lower volumetric flow rates and produced lower volumetric evaporation rates. The mister nozzle 30 had a higher rate of increase (i.e., slope) than the jet nozzle 30.

As shown in FIGS. 7 and 8, the evaporation rates and relative humidities were recorded for different test conditions (the "valve" referenced in FIG. 8 referring to a simple flow control valve that was used to control pressure). As shown, a greater evaporation rate was achieved with comparable conditions while using compressed air as opposed to uncompressed air (e.g., shop air) because the compressed air was warmer, and therefore increased the evaporation rate. Additionally, wastewater evaporation systems 10 with two outlets 26a, 26b were able to produce greater evaporation rates at medium and high outputs than similar output levels with a single outlet 26a, 26b.

FIGS. 9-25 illustrate another embodiment of a wastewater evaporation system 110 that may be used with wastewater (e.g., from power plants) to accelerate speeds at which the wastewater evaporates. Similar to the wastewater evaporation system 10, the wastewater evaporation system 110 may be positioned proximate a container 114 (e.g., the tank seen in FIG. 19) that stores the wastewater. In the illustrated embodiment, the container 114 is open to the atmosphere. In other embodiments, the container 114 is enclosed and may have a pressure different than atmospheric pressure. In some embodiments, the container 114 is an evaporation pond.

Figure 9:
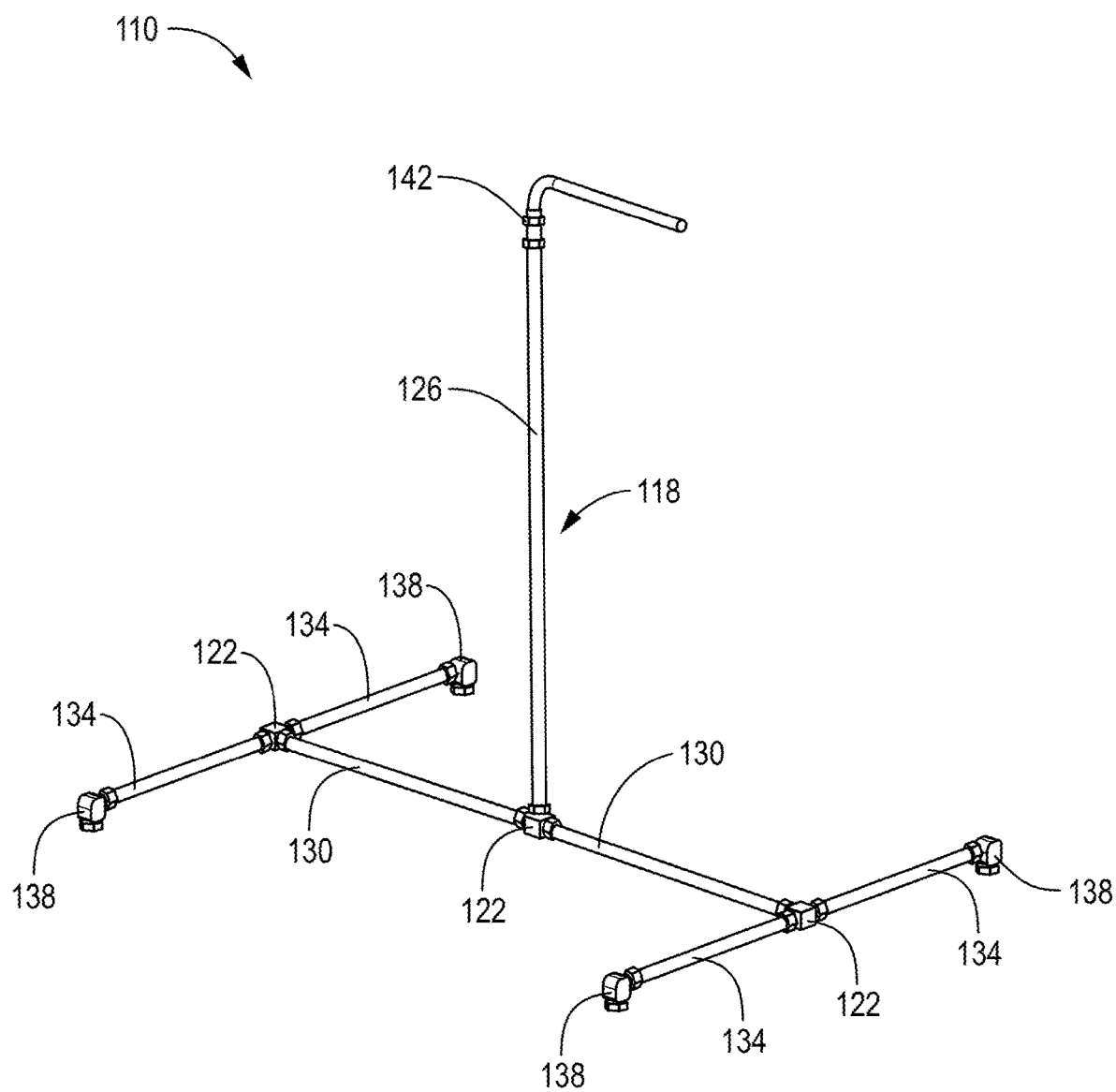
FIG. 9 is a perspective view of a manifold of a wastewater evaporation system according to another embodiment.

The wastewater evaporation system 110 includes three main components. With reference to FIG. 9, the first main component is a manifold 118. Similar to the manifold 18, the manifold 118 is at least partially submerged in the container 114 during use. The manifold 118 includes fittings 122 and tube sections 126, 130, 134, that are coupled to one another via the fittings 122. The tube sections 126, 130, 134 include a main vertical tube section 126. The main vertical tube section 126 may be coupled, for example, to at least one buoy to keep a portion of the manifold 118 above the wastewater in the container 114. The tube sections 126, 130, 134 also include long, horizontal tube sections 130 that are coupled to the main vertical tube section 126, and a set of shorter, horizontal tube sections 134 that are coupled to and extend from ends of the longer horizontal tube sections 130. The horizontal tube sections 130, 134 function as an injection head (similar to the injection head 26 described above) and are submerged at least partially underwater. In the illustrated embodiment, outlets 138 (e.g., including or coupled to nozzles similar to the nozzles 30 described above) are disposed at ends of the shorter horizontal tube sections 134. The vertical and horizontal tube sections 126, 130, 134 are used to direct air into the wastewater and form air bubbles in the wastewater. For example, air may pass down through an inlet 142 of the main vertical tube section 126, into the longer horizontal tube sections 130, and then through the shorts horizontal tube sections 134 and out of the outlets 138. The tube sections 126, 130, 134, as well as the outlets 138, may be arranged and oriented to direct the air in various directions when the air exits the outlets 138.

With continued reference to FIG. 9, in some embodiments the main vertical tube section 126 has a length of 36 inches, a length between 34-38 inches, between 32-40 inches, or other values and ranges. The longer horizontal tube sections 130 have lengths of 20 inches, lengths between 18-22 inches, between 16-24 inches, or other values and ranges. The shorter horizontal tube sections 134 have lengths of 14 inches, lengths between 12-16 inches, between 10-18 inches, or other values and ranges. In some embodiments the tube sections 128, 130, 134 and/or the fittings 122 are three quarter inch diameter tubes, although other embodiments include different sizes of tubes. In some embodiments, larger tube fittings 122 and/or tube sections (e.g., elbow-shaped tube sections) may be used to adjust the flow and size of the air bubbles. The size of the air bubbles may be directly proportional to the size of the outlets 138 and/or one or more of the tube sections 126, 130, 134. Once the air bubbles are formed, they may quickly break up as they traverse to the wastewater's surface. In some embodiments, the tube sections 126, 130, and/or 134 have a mass of 0.32 pounds per foot, although other embodiments include different masses. Additionally, in some embodiments the tube sections 126, 130, and/or 134 are comprised of stainless steel. Other embodiments include different numbers, arrangements, and sizes of tube sections and/or fittings than that illustrated, as well as different materials. Additionally, other embodiments include different angles of tube sections than that illustrated. For example, in some embodiments tube sections may extend at oblique angles (rather than horizontally) relative to the main vertical tube section 126, or may include more than one main vertical tube section 126, or a main tube section 126 that is not vertical.

With reference to FIGS. 10-12, the second main component of the wastewater evaporation system 110 is a cabinet 146. In the illustrated embodiment, the cabinet 146 houses an air compressor 150 used to supply air to the manifold 118. The air compressor 150 pressurizes the air as the air flows toward the manifold 118. The air compressor 150 raises the temperature of the air as a result of adiabatic heating (e.g., compression heating). In the illustrated embodiment, the air compressor 150 is fastened to an interior floor 154 of the cabinet 146.

In some embodiments, the cabinet 146 is modified to accommodate the air compressor 150. For example, one or more apertures may be drilled in the back and top of the cabinet 146. One of the apertures in the back of the cabinet 146 may sized for a flexible hose 158 (seen in FIGS. 16-18) that is connected to the manifold 118 to deliver compressed air from the air compressor 150 to the manifold 118. The hose 158 may be both heat resistant and pressure resistant. In some embodiments, a fitting (not illustrated) is fixed to the cabinet 146. The hose 158 is connected to the fitting, and tubing inside the cabinet 146 extends from the air compressor 150 to the fitting. Having a fitting fixed to the cabinet 146 may help to reduce stresses on the rest of the tubing that connects to the air compressor 150.

As illustrated in FIGS. 10-12, in the illustrated embodiment one of the apertures in the top of the cabinet 146 is used to add a chimney 162 through which air is drawn into the cabinet 146 for the air compressor 150. The chimney 162 includes a straight section 166 and an elbow section 170. In some embodiments, an additional chimney grate is added to reduce the amount of dust that enters the cabinet 146.

In the illustrated embodiment, the cabinet 146 also includes heavy duty castors 174 so that the cabinet 146 can be moved easily from one location to the next. The heavy duty castors 174 allow the cabinet 146 to be able to easily traverse over rocky and uneven ground. In some embodiments, the castors 174 have brakes to help hold the cabinet 146 in place, although in other embodiments the cabinet 146 may instead, or additionally, use extra planks or anchors to ensure the cabinet 146 does not move.

With reference to FIGS. 13-19, the third main component of the wastewater evaporation system 110 is a buoy system 178. In the illustrated embodiment the buoy system 178 includes two buoys 182. The buoys 182 are coupled to one another and to the main vertical tube section 126 of the manifold 118 via struts 186, a post base 190, and brackets 194. Each of the buoys 182 is two feet in length by three feet in height, and supports at least 200 pounds. Other embodiments include different numbers and sizes of buoys 182 than that illustrated (e.g., buoys 182 larger or smaller than the buoys 182), as well as different amounts of weight that are supported by each buoy 182 (e.g., at least 100 pounds, at least 150 pounds, at least 250 pounds, etc.). Additionally, other embodiments include different numbers and arrangements of struts 186, post bases 190, and/or brackets 194 to couple the buoys 182 together and support the manifold 118.

Figure 13:
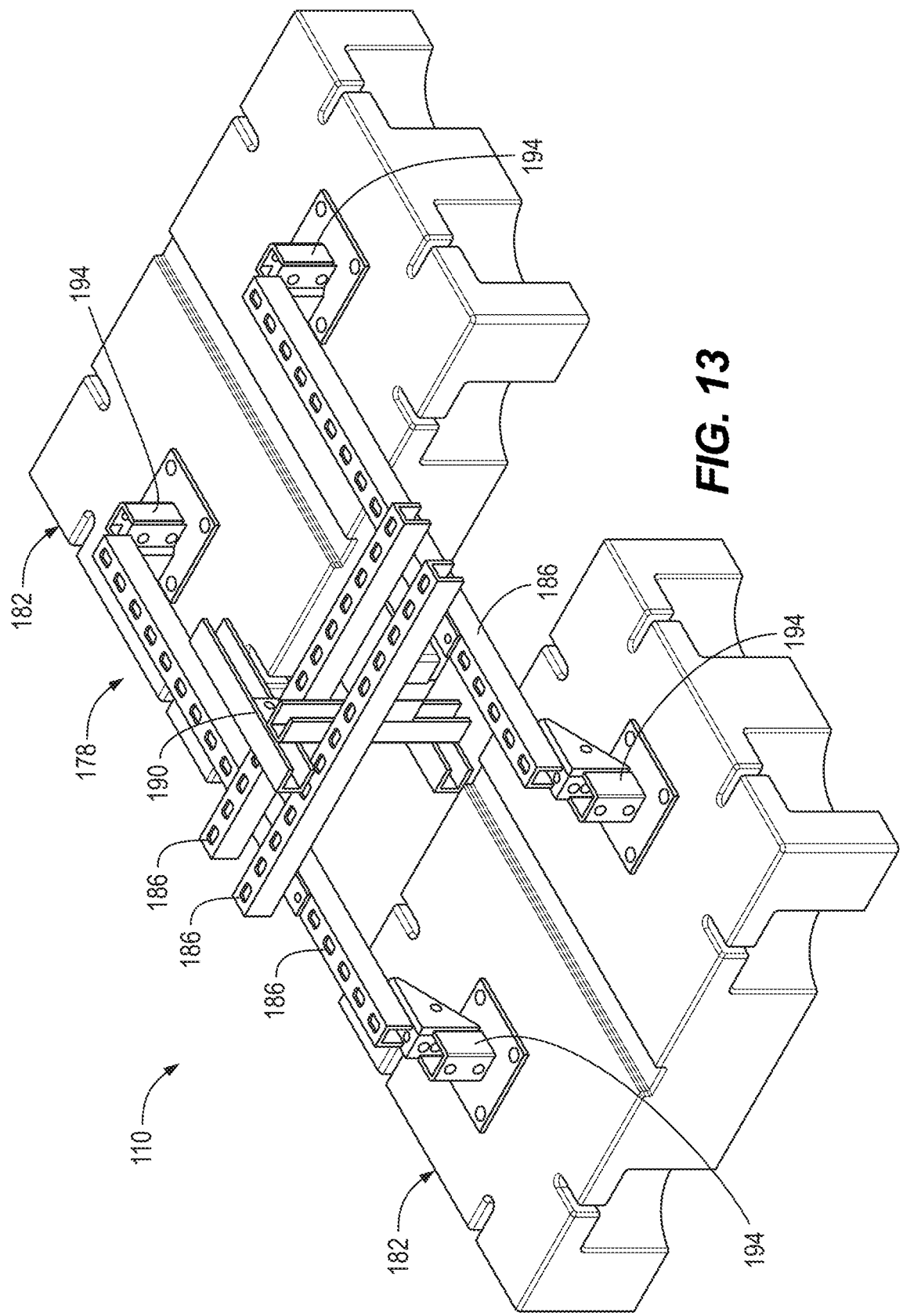
FIGS. 13-15 are perspective views of a buoy system of the wastewater evaporation system of FIG. 9.
Figure 14:
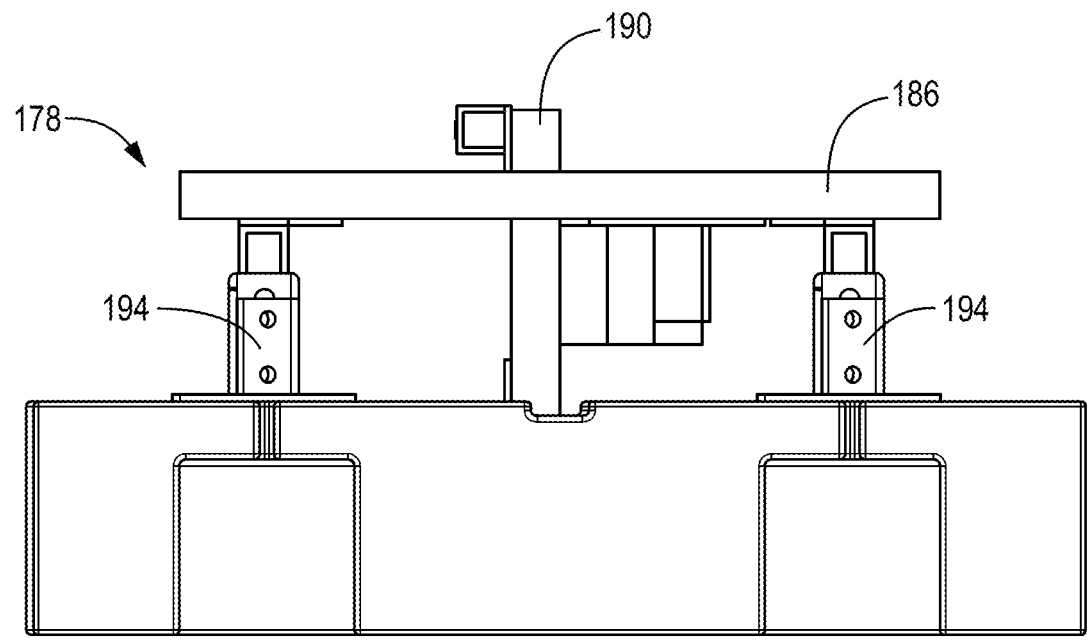
Figure 15:
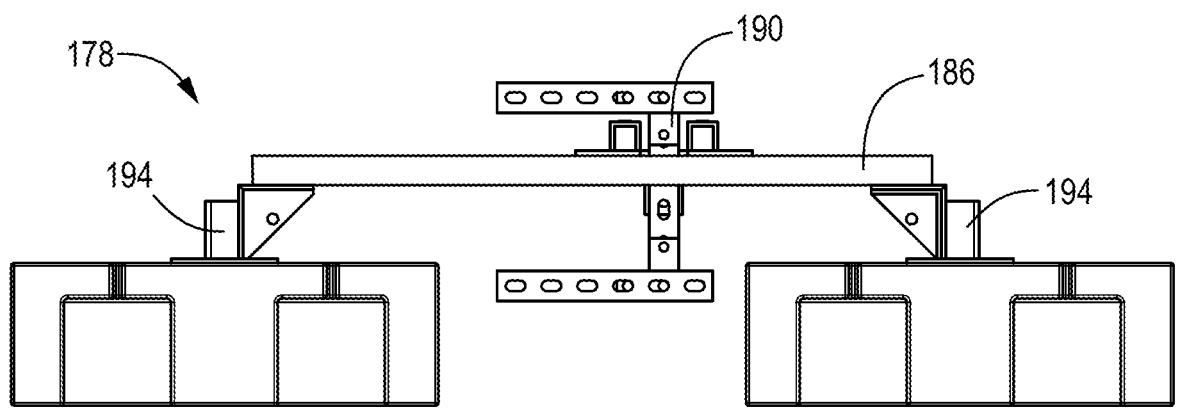

In some embodiments, the struts 186 are coupled directly or indirectly to the manifold 118, and/or form a platform for the post base 190 to be attached. The post base 190 may be, for example, one or more elongate elements (e.g., U-shaped) that are coupled (e.g., fixed) to the main vertical tube section 126. A portion of the manifold 118 (e.g., the main vertical tube section 126) may be guided and/or supported by the struts 186 and/or the post base 190. In some embodiments, at least two struts 186 support the tube sections 126, 130, 134 of the manifold 118. As illustrated in FIGS. 13-15, the brackets 194 may be used to couple the struts 186 and/or the post base 190 to the buoys 182.

With continued reference to FIGS. 13-19, the position of the struts 186 and the buoys 182 may be such that there is as little of the manifold 118 above the surface of the water as possible, without submerging the struts 186. The horizontal tube sections 130, 134 of the manifold 118 may be sized (e.g., in length) to allow air bubbles to form in the wastewater at locations away from the buoys 182, without significantly displacing the buoys 182, so that the manifold 118 will remain as level as possible. In some embodiments, one or more of the horizontal tube sections 130, 134 may be adjusted to so that a main disturbance from the air bubbles is kept as far as possible from the buoys 182.

Figure 16:
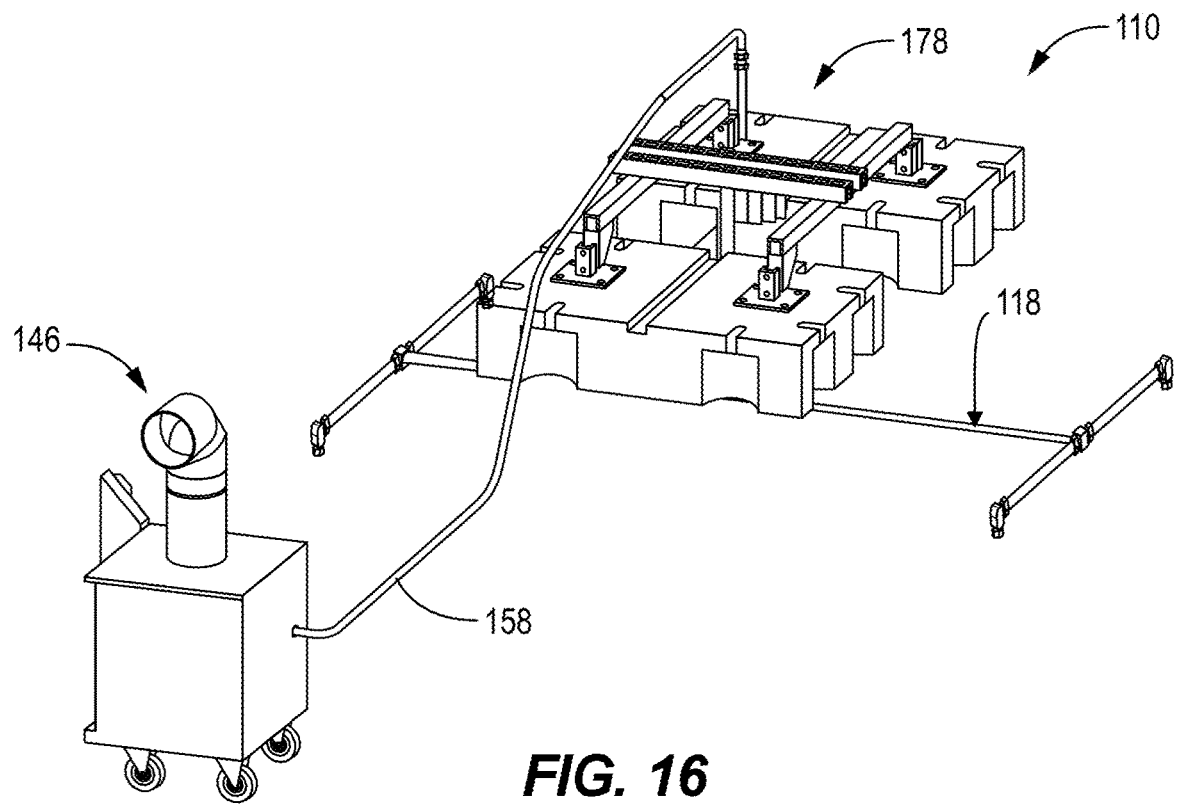
FIGS. 16-19 are perspective views of the fully assembled wastewater evaporation system of FIG. 9.
Figure 17:
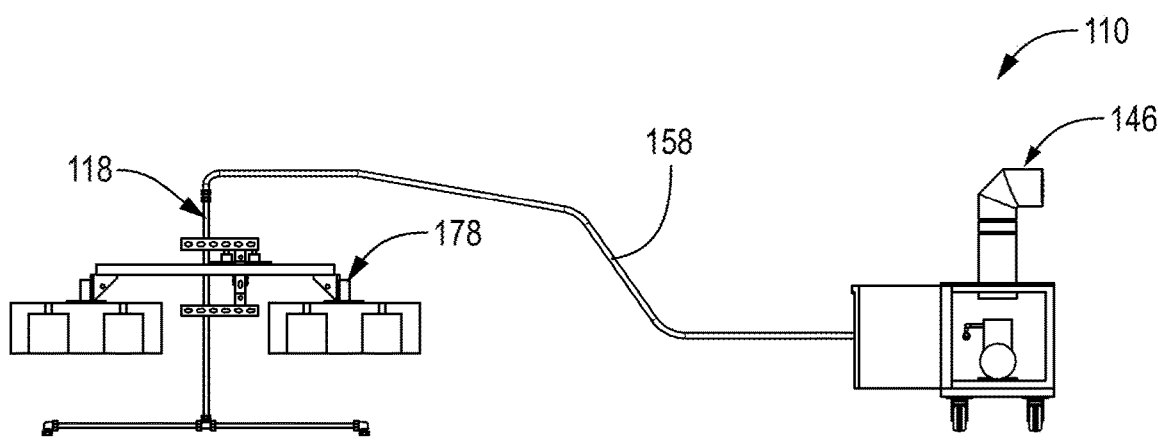
Figure 18:
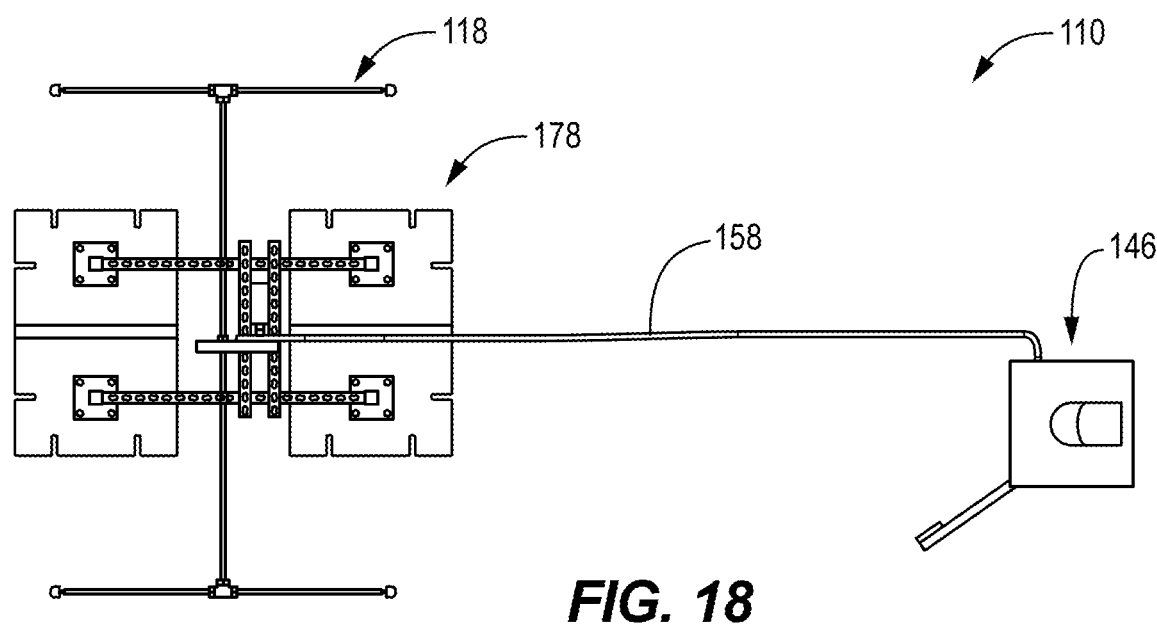
Figure 19:
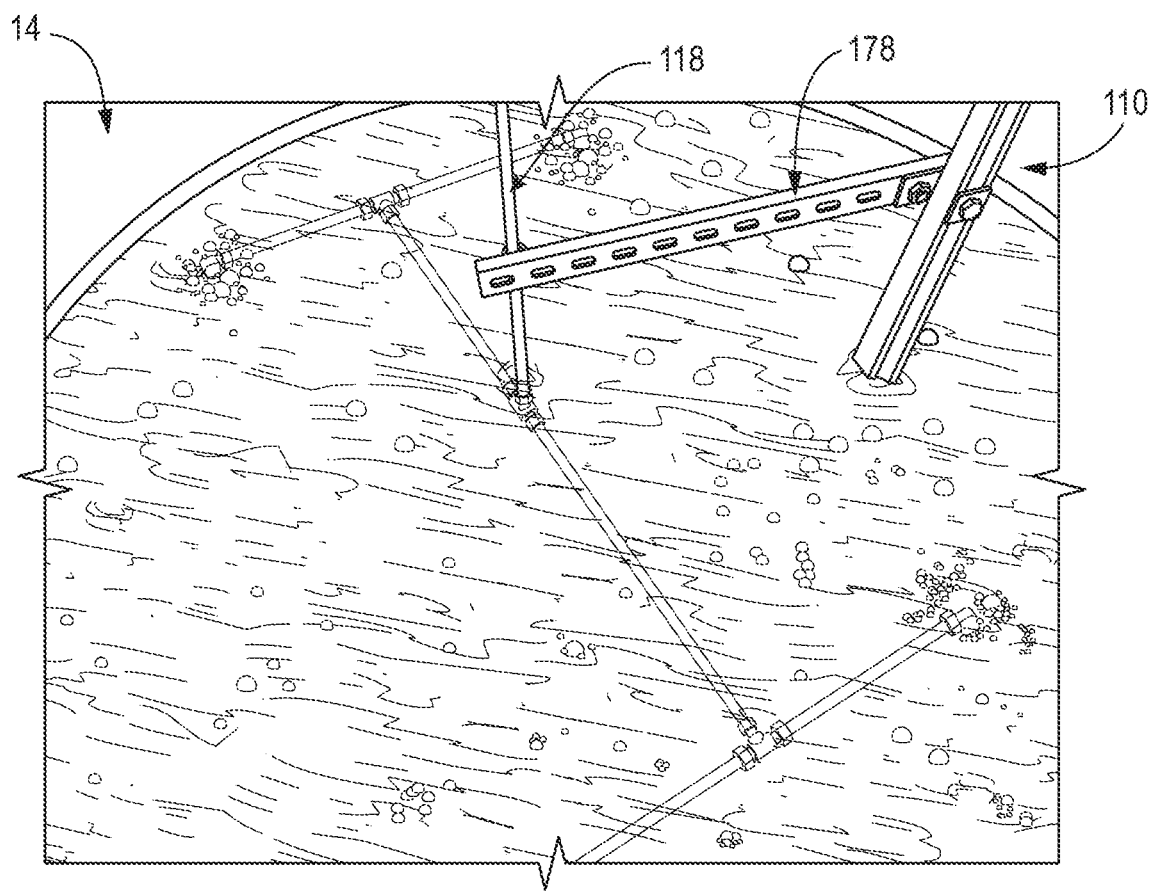

In the illustrated embodiment, and with reference to FIGS. 16-18, when the evaporation system 110 is fully assembled the cabinet 146 is located at a desired distance away from the manifold 118 and container 114. The hose 158 extends from the cabinet 146 to the manifold to deliver compressed air to the manifold 118. The manifold 118 is supported by the buoy system 178, such that compressed air exits out the outlets 138 and into the wastewater below the surface of the wastewater, to facilitate evaporation of the wastewater.

With reference to FIGS. 20-24, data from testing of embodiments of the wastewater evaporation system 110 was collected over several months. The set-ups for the testing included water evaporation systems 110 with two outlets 138, four outlets 138, and eight outlets 138. The two-outlet water evaporation system 110 was constructed of aluminum. The four-outlet and eight-outlet water evaporation systems 110 were constructed of stainless steel tubing.

Once the two and four injector systems were running for over a week, measurements were taken of the water levels in order to compare the evaporation rate between the two tanks. The observed evaporation rates were tabulated, along with all of the other pertinent weather data. FIG. 20 represents the data that was collected for these tests. As can be seen in the table in FIG. 20, the tank with the injected air bubbles had a much greater evaporation rate than the control tank. It is believed that this increase in evaporation rate was because the air bubbles created a greater surface area for evaporation by increasing the area through the air bubbles themselves as well as stirring up the water's surface. This larger surface area allowed evaporation to occur more quickly compared to the water in the control tank. It is believed that another reason for the high evaporation rate was that the compressed air was at a high temperature than the ambient air and increased the temperature of the water with which it came into contact. During the summer this temperature increase would not be expected to play much of a role. In the winter months, however, this increase in temperature could help to increase the evaporation rate by a great deal.

After the four injector water evaporation system 110 was run for a while, it was decided to move the wastewater evaporation system 110 next to a cooling tower, and use the water from the cooling tower instead because of its lower TDS (total dissolved solids). After the set up was moved, the eight-outlet water evaporation system 110 was installed. The results of the testing are illustrated in the table in FIG. 21. During testing these results showed less of a difference between the natural evaporation and the aerated tanks. After inspecting the equipment it was found that the air filter on the compressor had become clogged. The air filter was then replaced, and the air flow rate improved. In order to better monitor the rate of evaporation in the tanks a trail camera was installed on site.

After the data from the first set of experiments was gathered, a way to predict the evaporation rate was researched. Several equations were examined to calculate the evaporation rate as accurately as possible compared to the observed rate. The equations were chosen based on the closeness of their results to the observed results, and are the Modified Mass Transfer, Dalton, and the Lund sets of equations. The first two equations illustrated below represent the Modified Mass Transfer set of equations:

$$E = f(u)(e_s^* - e) \quad (1)$$

$$f(u) = (5 \times 10^6 / As)(3.6 + 2.5u) \quad (2)$$

Where $As$=water surface area (m$^2$), u=wind speed (m/s), $e_s^*$=saturation vapor pressure at water surface temperature (kPa), and e=vapor pressure of the air (kPa). This method depends heavily on the wind speed and as such the slightest change in the wind speed can drastically change the resulting evaporation rate.

Equation 3, below, represents the Dalton evaporation equation:

$$E_o = ku(e_s - e) \quad (3)$$

Where k=surface roughness factor (s$^2$/m$^2$), u=wind speed (m/s), $e_s$=saturation water vapor pressure at water surface temperature (hPa), and e=vapor pressure of the air (hPa).

Equation 4, below, is the Lund equation, which has been developed to work well with pools:

$$E = 15.0 * A(p_w - p_\alpha) F_\alpha \quad (4)$$

Where A=water surface area (m$^2$), pw=saturation vapor pressure at water surface temperature (kPa), $p_\alpha$=saturation pressure at air dew point (kPa), and $F_\alpha$=activity factor. For this equation the activity factor represents the degree to which the surface of the water is disturbed, which for a residential pool is 0.5 and for a wave pool is 1.5 or more. The results can be seen in comparison to the observed data in the table in FIG. 22.

After the equations were checked against the experimental data, a few theoretical cases were created to determine the amount of improvement in evaporation at different temperatures. The temperatures chosen were 35° F., 50° F., 65° F., and 80° F., and the relative humidity, along with all of the other pertinent parameters, was kept constant. The results can be seen in the table in FIG. 23.

Figure 24:
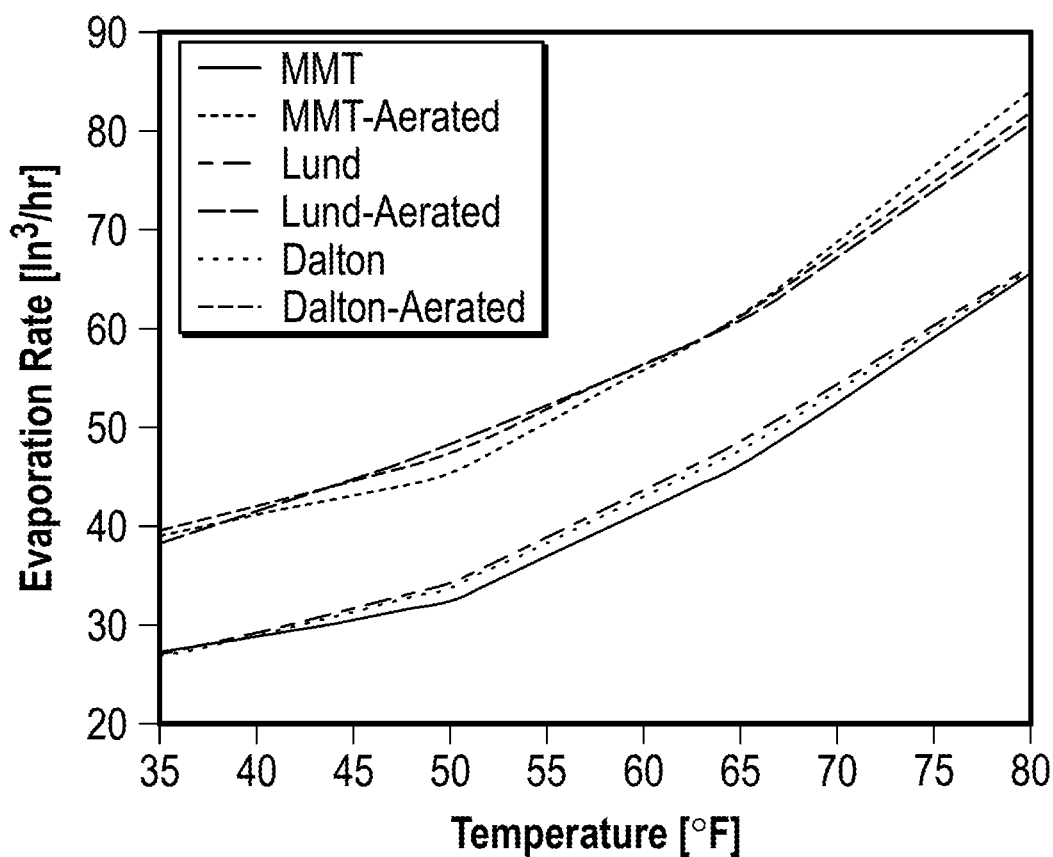

With reference to FIG. 24, it can be seen that as the temperature increased the improvement gained from the aeration of the water lessened. This is due in part to the heating of the water by the compressed air, which has less of an effect when the ambient temperature, and the water temperature, is higher.

Although certain aspects have been described in detail with reference to certain preferred embodiments, variations and modifications exist within the scope and spirit of one or more independent aspects as described.

What is claimed is:

1. A wastewater evaporation system comprising:
a manifold having a plurality of tube sections configured to direct compressed air into the wastewater, wherein a portion of the manifold defines an injection head configured to be at least partially submerged below a surface of wastewater, wherein the injection head includes an outlet;
an air compressor configured to direct the compressed air to the manifold; and
buoy system coupled to the manifold, wherein the buoy system includes a buoy configured to maintain a portion of the manifold above the surface of the wastewater, wherein the outlet is positioned to emit the compressed air into the wastewater outside of the manifold in a direction away from the buoy system.

2. The wastewater evaporation system of claim 1, wherein the plurality of tube sections includes a main vertical tube section, a first horizontal tube section coupled to the main vertical tube section, and a second horizontal tube section coupled to the first horizontal tube section, wherein the outlet is disposed at an end of the second horizontal tube section.

3. The wastewater evaporation system of claim 1, wherein the manifold includes a main vertical tube section, a first horizontal tube section coupled to a bottom of the main vertical tube section and extending in a first direction, a second horizontal tube section coupled to the bottom of the main vertical tube section and extending in a second, opposite direction, a third horizontal tube section coupled to an end of the first horizontal tube section and extending in a direction perpendicular to the first horizontal tube section, a fourth horizontal tube section coupled to the end of the first horizontal tube section and extending in a direction opposite to the direction of the third horizontal tube section, a fifth horizontal tube section coupled to an end of the second horizontal tube section and extending in a direction perpendicular to the second horizontal tube section, and a sixth horizontal tube section coupled to the end of the second horizontal tube section and extending in a direction opposite to the direction of the fifth horizontal tube section, wherein the outlet is a first outlet disposed at an end of the third horizontal tube section, wherein the manifold includes a second outlet disposed at an end of the fourth horizontal tube section, a third outlet disposed at an end of the fifth horizontal tube section, and a fourth outlet disposed at an end of the sixth horizontal tube section.

4. The wastewater evaporation system of claim 2, wherein the first horizontal tube section has a first length and the second horizontal tube section has a second length, and wherein the first length is greater than the second length.

5. The wastewater evaporation system of claim 2, wherein the main vertical tube section, the first horizontal tube section, and the second horizontal tube section are each comprised of stainless steel.

6. The wastewater evaporation system of claim 1, further comprising a cabinet that houses the air compressor, wherein the cabinet includes an aperture, and wherein a flexible hose extends through the aperture and is coupled to both the air compressor and the manifold to facilitate movement of compressed air from the air compressor to the manifold.

7. The wastewater evaporation system of claim 1, further comprising a cabinet that houses the air compressor, wherein the cabinet includes a chimney configured to draw air into the cabinet for the air compressor.

8. The wastewater evaporation system of claim 1, further comprising a cabinet that houses the air compressor, wherein the cabinet includes a plurality of castors.

9. The wastewater evaporation system of claim 1, wherein the buoy is a first buoy, and wherein the buoy system includes a second buoy.

10. The wastewater evaporation system of claim 9, wherein the main vertical tube section extends between the first buoy and the second buoy, and wherein each of the first and second buoys is coupled to the main vertical tube section.

11. The wastewater evaporation system of claim 9, wherein each of the first and second buoys is configured to support at least 200 pounds.

12. The wastewater evaporation system of claim 9, wherein the first and second buoys are coupled together via a strut.

13. The wastewater evaporation system of claim 1, wherein the buoy system includes a plurality of struts coupled to the buoy and to the manifold.

14. A method for evaporating wastewater, the method comprising:
providing a manifold having an injection head, and a buoy system coupled to the manifold;
positioning the injection head of the manifold at least partially beneath a surface of the wastewater; and
injecting air through an outlet of the injection head and into the wastewater outside of the manifold along a direction away from the buoy system.

15. The method of claim 14, further comprising compressing the air prior to reaching the injection head, wherein compressing the air results in adiabatic heating of the air.

16. The method of claim 14, wherein the outlet includes a first nozzle and a second nozzle, the method further comprising directing the air in a first direction through the first nozzle out of the injection head, and directing the air in a second direction through the second nozzle out of the injection head.

17. The method of claim 16, wherein the first direction and the second direction are generally horizontal to the surface of the water.

18. The method of claim 16, wherein the first nozzle is selected from a group consisting of a jet nozzle and a mister nozzle.

19. The method of claim 14, further comprising positioning a second injection head beneath the surface of the wastewater, and injecting air through the second injection head and into the wastewater.

20. The method of claim 14, further comprising directing the air from a cabinet through a hose to the injection head.

* * * * *